United States Patent
Oguma (10) Patent No.: US 7,434,042 B2
(45) Date of Patent: Oct. 7, 2008

(54) APPARATUS, METHOD AND RECORDING MEDIUM FOR STARTING UP DATA PROCESSING SYSTEM

(75) Inventor: Yukio Oguma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 10/786,054

(22) Filed: Feb. 26, 2004

(65) Prior Publication Data

US 2004/0215952 A1 Oct. 28, 2004

(30) Foreign Application Priority Data

Apr. 24, 2003 (JP) ............................ 2003-119808

(51) Int. Cl.
*G06F 15/177* (2006.01)
*G06F 9/24* (2006.01)
*G06F 1/24* (2006.01)
*G06F 9/00* (2006.01)

(52) U.S. Cl. .................. 713/2; 713/1; 713/100; 710/1

(58) Field of Classification Search .............. 713/1, 713/2, 100; 710/1
See application file for complete search history.

(56) References Cited

U.S. PATENT DOCUMENTS

| | | | |
|---|---|---|---|
| 6,105,130 A | * | 8/2000 | Wu et al. ................ 713/2 |
| 6,272,626 B1 | * | 8/2001 | Cobbett ................... 713/2 |
| 6,754,818 B1 | * | 6/2004 | Lee et al. ................ 713/2 |
| 2001/0052069 A1 | * | 12/2001 | Sekiguchi .............. 713/2 |
| 2004/0030883 A1 | * | 2/2004 | Munguia et al. ........ 713/100 |

FOREIGN PATENT DOCUMENTS

| | | |
|---|---|---|
| JP | 3-229331 | 10/1991 |
| JP | 11-53214 | 2/1999 |
| JP | 11-265292 | 9/1999 |
| JP | 2000-81978 | 3/2000 |
| JP | 2002-259130 | 9/2002 |

OTHER PUBLICATIONS

QValueList Class Reference, Online Reference documentation, http://www.handhelds.org/~zecke/apidocs/qt/qvaluelist.html.*

* cited by examiner

*Primary Examiner*—Rehana Perveen
*Assistant Examiner*—Fahmida Rahman
(74) *Attorney, Agent, or Firm*—Staas & Halsey LLP

(57) ABSTRACT

A data processing system comprised of multiplexed boot devices storing operating systems so that when a device of a master system cannot be used for startup, a device of a slave system is forcibly switched to for startup, wherein a memory stores boot firmware environment variable area including first variable data including device setting data of boot candidates, second variable data including index data designating a boot device based on that device setting data, and third variable data in which a binary value indicating if multiplexing is "valid" or not is set and wherein boot firmware decides on a boot device based on the settings of the environment variable areas and starts up the operating system stored in that boot device to start up the system.

17 Claims, 7 Drawing Sheets

APPARATUS, METHOD AND RECORDING MEDIUM FOR STARTING UP DATA PROCESSING SYSTEM

CROSS-REFERENCE TO RELATED APPLICATION

This application claims the priority of Japanese Patent Application No. 2003-119808, filed on Apr. 24, 2003.

BACKGROUND OF THE INVENTION

1. Field of the Invention

The present invention relates to a data processing system provided with multiplexed boot devices storing an operating system, more particularly relates to a data processing system linked with system software for multiplexing boot devices so that when startup by a boot device of a master system is not possible, a boot device of a slave system is forcibly switched to and startup is enabled from the boot device of the slave system in the next boot.

2. Description of the Related Art

In general, a computer or other data processing system is configured to start up the operating system from a hard disk or other boot device in response to a startup signal. In the case of such a configuration, when the boot device is broken, the operating system can no longer be started. In particular, if such trouble occurs in a computer, if that computer is connected to other computers on a network, the problem arises that all service to the other computers will end up being stopped.

On the other hand, recently, as one technology for raising the fault tolerance of data processing systems, the practice as been to configure a plurality of hard disks by a redundant arrays of inexpensive disks (RAID) to achieve redundancy. This RAID configuration, however, is technology for raising the reliability of read out data by mirroring or striping and does not raise the reliability of operation for system startup.

Therefore, a data processing system has been developed with multiplexed, for example, duplexed disk devices as boot devices. When detecting that any of the disk devices has been broken, a switching operation is performed to switch to another boot device from among the plurality of disk devices provided in the system so as to start up the computer system. With such a data processing system, however, the switch operation for this switching is performed manually by a system manager etc. Further, the judgment as to if the system has been started up normally or has failed to start up is also performed by a human operator.

With such a data processing system, when a disk device is broken, time is wasted for starting up the system again. This hinders system operations. Therefore, a data processing system has been proposed where when one of duplexed disk devices has been destroyed, the other disk device is automatically switched to so as to sufficiently raise the reliability of operation in system startup.

The method of switching for duplexed disk devices in such a data processing system is for example disclosed in Japanese Unexamined Patent Publication (Kokai) No. 3-229331. When a control unit provided with the operating system of the data processing system detects that one of the disk devices has broken down, it automatically stores initial microprogram load (IMPL) disk data and initial program load (IPL) disk device data in a nonvolatile memory provided in the system. In this example, since the nonvolatile memory automatically stores the IMPL disk data and IPL disk device data, the control unit can determine the disk device data to be stored next and can automatically switch to another normal disk device.

Further, another example is disclosed in Japanese Unexamined Patent Publication (Kokai) No. 2000-81978. In the data processing system of this example, when failure occurs in one of the duplexed disk devices storing the operating systems, the time until recovery from the failure in the disk device is shortened. With this data processing system, when one disk device is broken, the system is ended once and, before restart, switching is performed and the system registered so that the other unbroken disk device becomes the master, while the broken disk device becomes the slave. Due to this, when the system is restarted, the operating system is started by the IPL of the master unbroken disk device and the system starts up.

Further, another example is disclosed in Japanese Unexamined Patent Publication (Kokai) No. 2002-259130. In the data processing system of this example, provision is made of duplexed disk devices individually storing the operating system, a means for starting up the operating system, and a means for detecting completion of startup of the operating system. The time elapsed from when the startup signal for starting up the operating system has been generated is counted and control performed for switching the boot disk device for starting up the operating system based on whether completion of startup of the operating system has been detected in the predetermined elapsed time from the generation of the startup signal.

In this data processing system, it is possible to automatically detect completion of startup of the operating system and possible to detect completion of startup of the operating system within a predetermined elapsed time from the generation of the startup signal. The switching of the boot disk device for startup of the operating system is automatically controlled based on whether or not completion of startup of the operating system has been detected. Therefore, even without human intervention, judgment of whether the operating system could be started up normally and restart of the operating system from the other boot disk device can all be automatically performed.

On the other hand, each of the duplexed boot disk devices in such a data processing system stores the various programs for starting up the disk devices. Each of the disk devices, for example, stores, from the start block of the disk drive, a boot block program, operating system loader, operating system, and system software and after that stores data.

At the time of startup of the data processing system, the boot firmware stored in the nonvolatile memory in the system is loaded into the main memory. Next, due to the operation of this boot firmware, a boot disk device is selected. The boot block program stored in the selected disk device is read out and loaded into the main memory. This boot block program loads the operating system loader stored in the boot disk device into the main memory. Next, the operating system loader reads the operating system into the main memory, whereupon the operating system loads the system software stored in the boot disk device into the main memory. Which of the master system or slave system of the duplexed disk devices this system software has been started up from is checked for control of duplexing. Due to the startup of the system software, the duplexed disk devices are subsequently switched at the time of normal operation of the operating system.

Summarizing the problem to be solved by the invention, in the data processing system of the related art, the system hardware is duplexed so as to impart redundancy against hardware errors occurring when accessing the system hardware at time of operation and thereby enhance reliability. In this data processing system, redundancy is realized by processing of the system software stored in the boot disk devices. Therefore, in processing for starting up the system, the processing proceeds once until startup of the system software, then in the subsequent processing even if error occurs in accessing the duplexed system disk devices, continued operation becomes possible using the data of the one not suffering from error.

Further, when error frequently occurs in the system disk device of the master system among the duplexed systems, it is possible to cut off the disk device of the master system and then boot the system from the system disk device of the slave system. At the time of processing for starting up the system, however, even if the boot disk devices are duplexed, switching triggers detection of an abnormality in the disk device of the master system. Therefore, if an abnormality occurs in the system disk device of the master system before startup of the system software stored in the disk device of the master system proceeds, it is not possible to operate the system software for control of duplexing. Therefore, the problem arises that even if the disk devices are duplexed, if an abnormality occurs in the disk device of the master system, it is not possible to switch to the disk device of the slave system, so it is not possible to start up the system.

SUMMARY OF THE INVENTION

An object of the present invention is to provide an apparatus given the conventional function of switching boot devices upon detection of a hardware abnormality after startup of system software and additionally the function of enabling switching of boot devices even when a hardware abnormality occurs before startup of system software and to provide an apparatus having further the function of forcibly switching boot devices with each boot regardless as to detection of a hardware abnormality and a function of processing for restoring to the original state the boot device forcibly switched at the time of startup of system software.

Another object of the present invention is to provide a method for starting up a data processing system given the conventional function of switching boot devices upon detection of a hardware abnormality after startup of system software and additionally the function of enabling switching of boot devices even when a hardware abnormality occurs before startup of system software and to provide a method for starting up a data processing system having further the function of forcibly switching boot devices with each boot regardless as to detection of a hardware abnormality and a function of processing for restoring to the original state the boot device forcibly switched at the time of startup of system software.

Another object of the present invention is to provide a recording medium storing a program given the conventional function of switching boot devices upon detection of a hardware abnormality after startup of system software and additionally the function of enabling switching of boot devices even when a hardware abnormality occurs before startup of system software and to provide a recording medium storing a program having further the function of forcibly switching boot devices with each boot regardless as to detection of a hardware abnormality and a function of processing for restoring to the original state the boot device forcibly switched at the time of startup of system software.

To attain the above object, the present invention provides an apparatus where an operating system read out from a selected device of a multiplexed plurality of devices is started up for starting up the system, comprising a storing unit which stores environment data for setting a boot from a plurality of devices, a boot control unit which decides on a boot device based on the setting of the environment data and starting up the operating system stored in the boot device, and a control unit which controls multiplexing of the plurality of devices, the control unit changing the setting of the environment data and controlling switching to another device when an abnormality is detected in the boot device.

To attain the above object, the present invention provides a method for starting up data processing system in which an operating system read out from a selected device of a multiplexed plurality of devices is started up for starting up the system, comprising the steps of storing environment data for setting a boot from said plurality of devices, deciding on a boot device based on the setting of said environment data and executing a boot control which starts up said operating system stored in said boot device, controlling multiplexing of said plurality of devices, and changing the setting of said environment data and switching to another device when an abnormality is detected in said boot device.

To attain the above object, the present invention provides a recording medium storing a program which starts up an operating system read out from a selected device of a multiplexed plurality of devices and starts up a data processing system, the program comprising the steps of storing environment data for setting a boot from said plurality of devices, deciding on a boot device based on the setting of said environment data and executing a boot control which starts up said operating system stored in said boot device, controlling multiplexing of said plurality of devices, and changing the setting of said environment data and switching to another device when an abnormality is detected in said boot device.

Preferably, the environment data includes first variable data including device setting data designating bootable candidates for a plurality of devices, second variable data including index data designating a boot device based on the device setting data, and third variable data in which a binary value indicating whether the multiplexing is valid or not is set.

More preferably, the boot control unit clears the index data to an initial value at the time of powering up the system and selects the device initially set in the device setting data for a boot or selects a boot device designated by the index data when "valid" is set in the third variable data and selects the device initially set in the device setting data for a boot when "not" is set.

Preferably, the boot control unit updates an index in the index data when "valid" is set in the third variable data or selects a boot device set in the environment data and reads in and starts up the operating system stored in the boot device.

Alternatively, the control unit refers to the setting in the first variable data and confirms that the boot device of the slave system has been used for startup when "valid" is set in the third variable data and the index data is not the initial value or issues a warning message showing that an abnormality has occurred in the device of the master system when recognizing that a boot device of a slave system has been used for startup.

Still more preferably, the control unit clears the second variable data to the initial value regardless of whether the boot device of the master system was used for startup or a boot device of a slave system was used for startup.

Still more preferably, the control means cuts off a boot device when detecting an abnormality in the boot device without regard as to if there is third variable data in the storing unit and rewrites setting data of the devices serving as the boot candidates of the first variable data.

BRIEF DESCRIPTION OF THE DRAWINGS

Other features, objects, and advantages of the present invention will become apparent from the following description of preferred embodiments given with reference to the drawings in which similar reference notations designate similar or corresponding parts throughout several views, and in which.

DESCRIPTION OF THE PREFERRED EMBODIMENTS

Preferred embodiments of the data processing system according to the present invention will be described in detail below while referring to the attached figures. Before explaining the data processing system of the preferred embodiments, however, a data processing system according to the related art serving as the basis for the data processing system of the embodiments will be described in detail to help clarify the features and effects of the embodiments.

Figure 6:
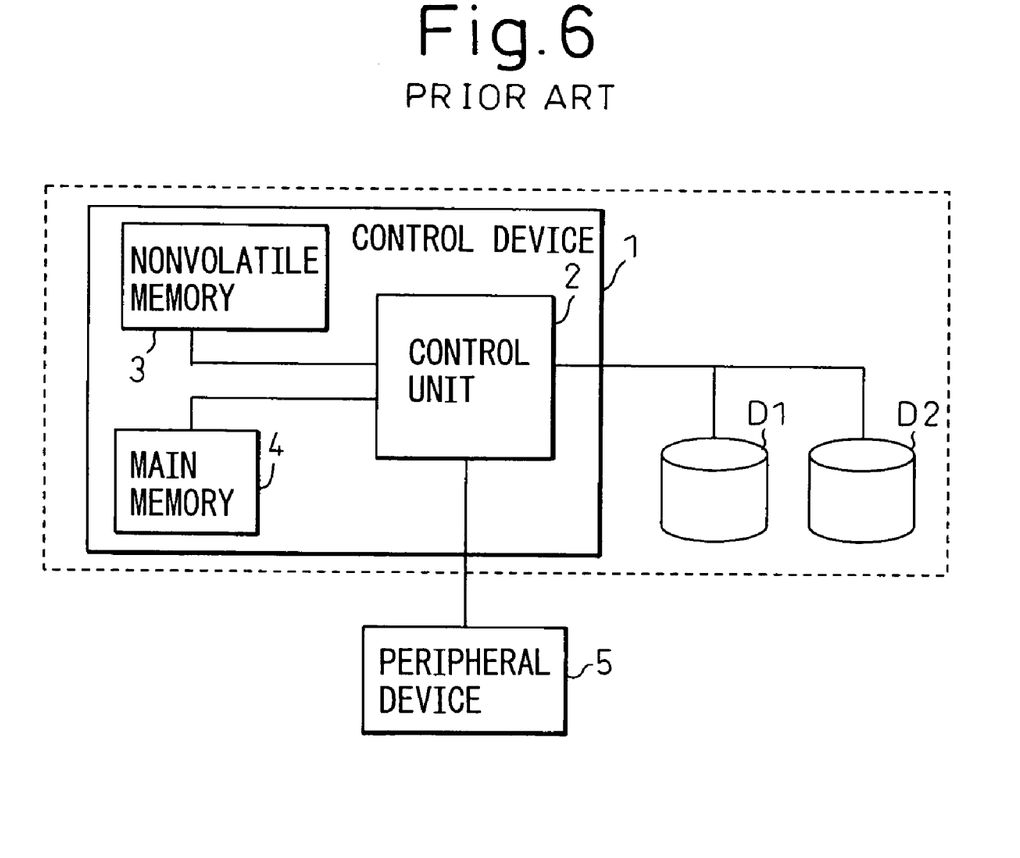
FIG. 6 is a view for explaining the general block configuration of a data processing system according to the related art.

The general configuration of a data processing system according to the related art is shown in FIG. 6. This data processing system is provided with a control device 1 and disk devices D1 and D2. The control device 1 includes a control unit 2 having a CPU, a nonvolatile memory 3, and a main memory 4. Further, the control unit 2 has a keyboard, monitor device, or other peripheral device 5 connected to it.

Figure 7:
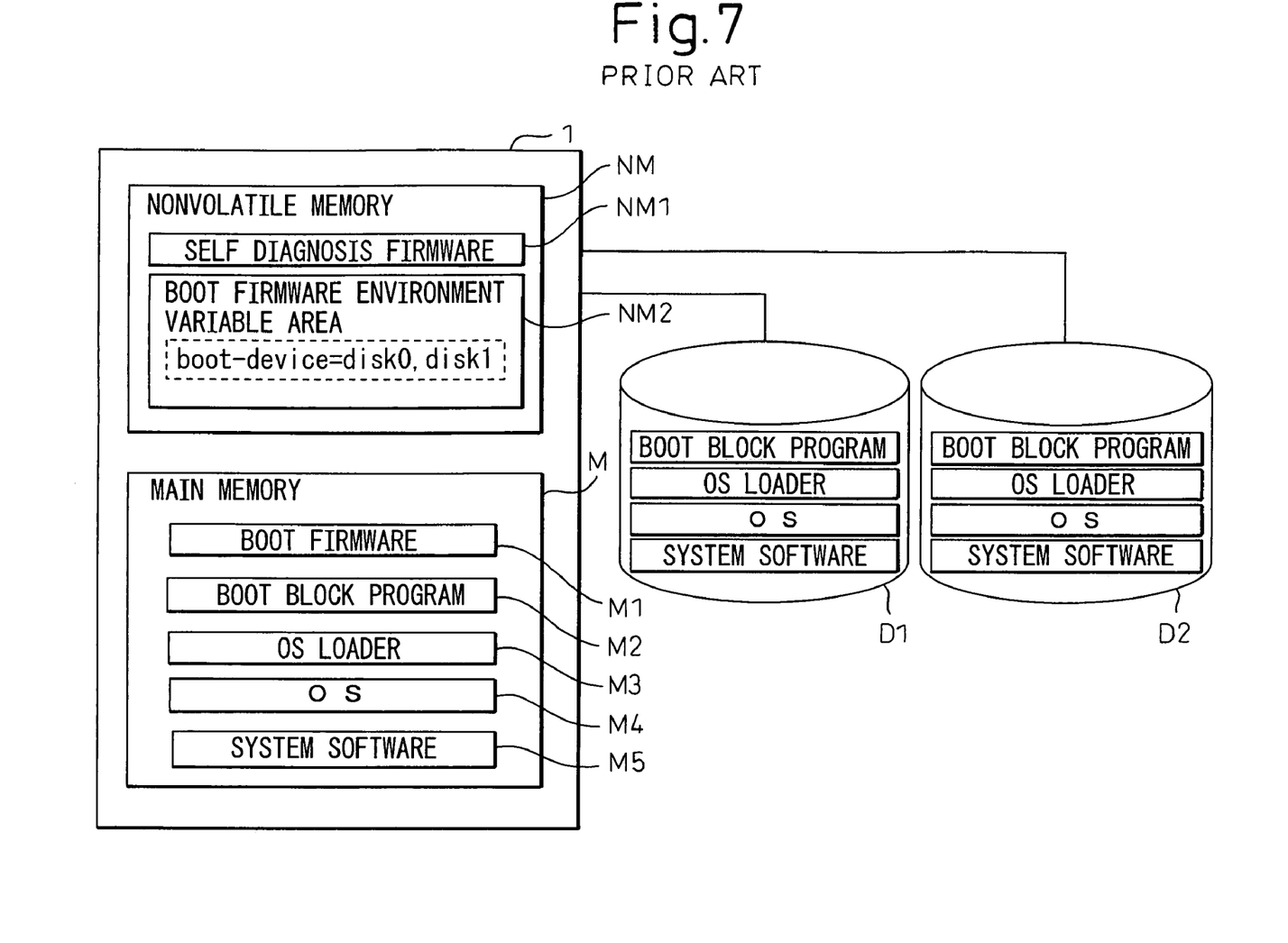
FIG. 7 is a view for explaining the general block configuration of principal parts relating to a data processing system according to the related art having duplexed boot devices.

FIG. 7 shows the detailed configuration of the control device and disk devices D1 and D2 of the data processing system shown in FIG. 6. A data processing system according to the related art where the boot block program and the system software independently switch the boot disk devices is shown. Note that this figures shows the configuration of mainly the parts relating to the startup of the data processing system. In the figure, parts the same as the data processing system shown in FIG. 6 are assigned the same reference notations.

In the data processing system of FIG. 7, the disk devices D1 and D2 duplexed in the control device 1 are connected. Each of the disk devices D1 and D2 stores the boot block program, operating system loader, operating system, and system software from the head of the disk in that order. Each disk device, while not shown, stores the data after that.

The control device 1 is provided with a nonvolatile memory NM and a main memory M. In the figure, however, the parts relating to the system startup are shown as representative parts. The nonvolatile memory NM stores self-diagnosis firmware NM1 and a boot firmware environment variable area NM2. While not shown, it also stores binary data of the boot firmware. The boot firmware environment variable area NM2 stores the environment data of the boot firmware. In the figure, this is duplexed by the disk devices D1 and D2, so "boot device=disk0, disk1" is stored as the environment variable area. In the environment variable area, "disk0" is linked with the disk device D1, while "disk1" is linked with the disk device D2. The booting is performed by the disk devices D1 and D2. At the time of startup, this shows that the startup processing is performed from the disk device D1.

Further, the main memory M does not store anything before startup, but the figure shows the state of loading of the software read from the boot disk device at the time of system startup. The boot firmware M1 reads the data of the boot firmware stored in the nonvolatile memory NM. The boot block program, operating system loader M2, operating system M4, and system software M5 are stored in the boot disk device, but are read into the main memory M at the time of system startup.

Therefore, the operation where the boot firmware M1 and the system software M5 independently switch the boot disk device in the data processing system shown in FIG. 7 will be summarized next.

First, when the power is turned on and the processing for system startup is started, the self-diagnosis firmware NM1 is started up and a system check is performed. Further, the data of the boot firmware stored in the nonvolatile memory NM is read into the main memory M and used as the boot firmware M1. The environment variable area for the boot control provided in the boot firmware environment variable area NM2 is "boot device=disk0, disk1", so the boot firmware M1 accesses the disk device set in the environment variable area and decides on the device which can be first normally accessed as the boot device. Here, if the boot device is determined, next the boot firmware M1 will not deliberately change the boot disk device.

Next, the boot firmware M1 accesses the boot disk device selected above, reads the boot block program written at the start block into the main memory, and loads it into the boot block program M2. The boot firmware M1 shifts control to the read boot block program M2.

When the boot block program M2 is started up, the boot block program M2 reads the operating system loader stored in the disk device in which it is itself stored, in the illustrated example, the disk device D1, and shifts control to the operating system loader M3.

When the operating system loader M3 is started up, the operating system loader M3 reads the operating system stored in the disk device D1 in which it is itself stored and transfers control to the operating system M4.

When the operating system M4 is started up, the operating system M4 reads the system software stored in the disk device D1 in which it is itself stored into the main memory M, loads the system software M5, and starts up the system software M5. Here, when the system software M5 is operated normally, the operation is shifted to.

In the above way, in the data processing system shown in FIG. 7, an operation in which the boot firmware M1 and the system software M5 independently switch the booted disk drive is performed.

When the system software M5 can normally shift to operation, the system software M5 can execute switching control, so if detecting an abnormality of the boot disk drive D1, the disk drive D1 can be cut off. In this case, in the next reboot, the boot disk drive D1 is switched to, so the system software M5 rewrites the environment data of the boot firmware environment variable area NM2 in the nonvolatile memory NM.

However, in this way, the boot firmware M1 and the system software M5 proceed with the processing independently. After the boot firmware M1 selects the boot disk device in accordance with the environment data of the boot firmware and during processing before control shifts to the system software M5, sometimes some sort of abnormality occurs and processing cannot be continued. In this case, since the system software M5 is not yet started up, the environment data of the boot firmware environment variable area NM2 cannot be rewritten. Therefore, in the next reboot as well, it is not possible to change the boot disk device to the other disk device without an abnormality. As a result, the system cannot be started up.

In this way, in the data processing system according to the related art, there was the problem that when some sort of abnormality occurred during the processing before control by startup of the system software M5, despite the fact that the boot disk device was given redundancy, the system could not be started up.

Further, in the data processing system of the related art, the module detecting an abnormality of the disk device tried to switch the boot disk device by processing for rewriting the environment data "boot-device" of the boot firmware environment variable area individually. At this time, it became necessary to make the change conscious of the redundant configuration of the disk device being booted in all of initialization of the boot block program, operating system loader, and operating system. In general, however, there was the problem that it was difficult for the initialization units of the boot block program, operating system loader, and operating system to apply changes conscious of a specific redundant configuration.

Therefore, in the data processing system of the present embodiment, it is made possible for the following two requirements by the switching mechanism provided in the data processing system to be passed on as they are. That is, the first requirement is that the boot firmware successively access the disk devices set in the environment data "boot-device" and decide on the disk device which could first normally be accessed as the boot disk device. The second requirement is that when the system software could normally shift to operation, the system software can perform switching control and, when detecting an abnormality in the disk device, can cut off that boot disk device.

Since the data processing system is made one meeting the above requirements, in the present embodiment, the environment data stored in the boot firmware environment variable area in the nonvolatile memory is made the first variable "boot-device" enabling data on the device to be booted to be set, the second variable "boot-device-index" showing data on the order of booting, and the third variable "boot device index available" showing if the function for successively accessing the disk devices and deciding on the disk device which could first normally be accessed is valid or not.

The first variable "boot-device" is set as "boot device=disk0, disk1, disk5" when there are for example three redundant disk devices. Further, the second variable "boot-device-index" designate the disk device to be booted in the next boot. For example, if the first variable is as explained above, the index number of the "disk0" becomes the initial value "0", the index number of the "disk1" becomes "1", and the index number of the "disk5" becomes 2. The third variable "boot-device-index available" has a "true" and a "false" value. When this value is selected and the switching function by the above duplexing is valid, "true" is set, while when not, "false" is set.

Figure 1:
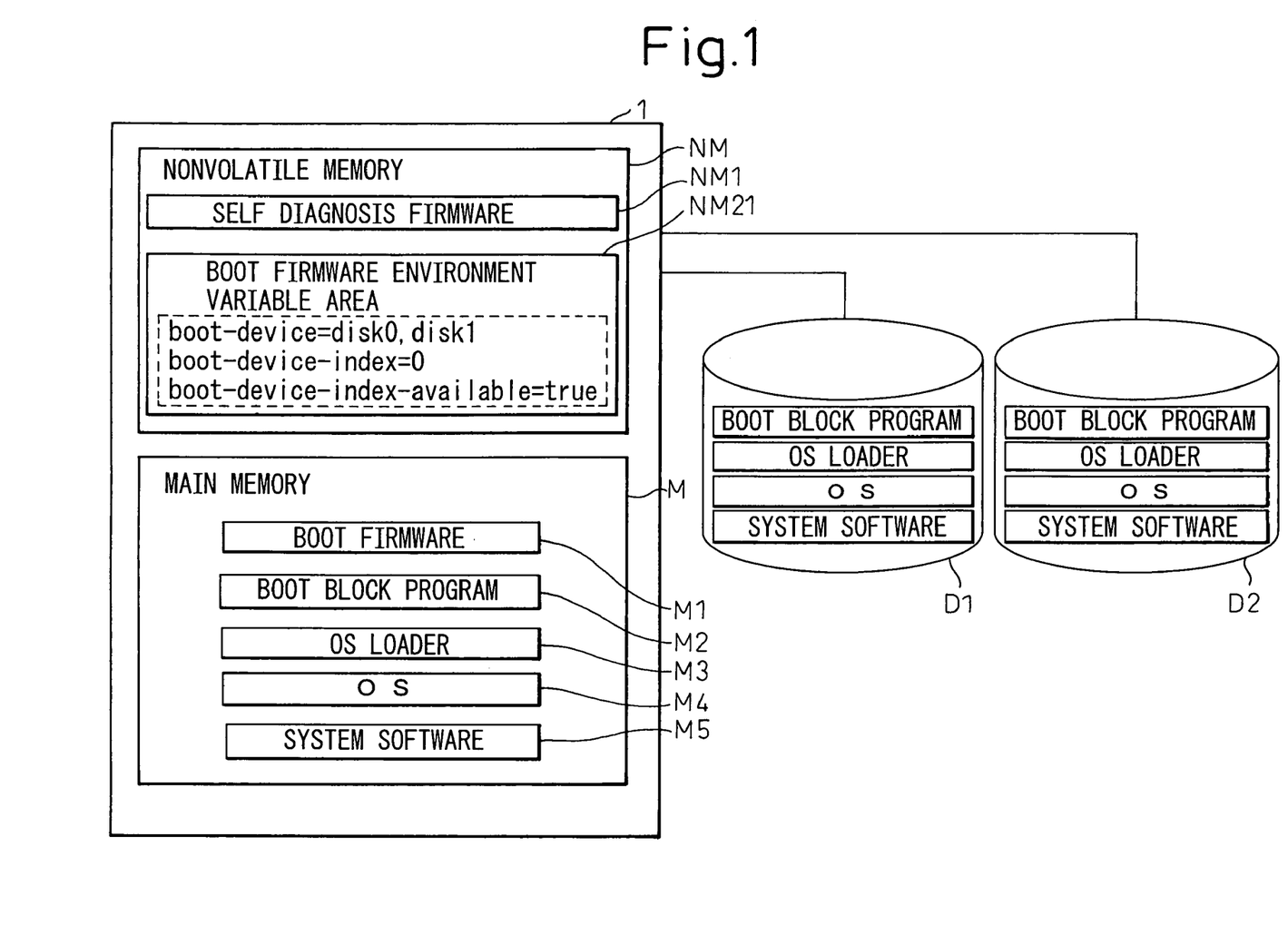
FIG. 1 is a view for explaining the general block configuration of principal parts relating to a data processing system according to an embodiment having duplexed boot devices.

The configuration of the data processing system of the present embodiment in which the boot firmware environment variable area comprised of the above three environment data is provided in the nonvolatile memory is shown in FIG. 1. In FIG. 1, parts similar to the configuration of the data processing system according to the related art shown in FIG. 7 are assigned the same reference notations. Note that FIG. 1 as well, in the same way as in FIG. 7, shows mainly the configuration relating to the system startup in the configuration of the data processing system.

The data processing system of FIG. 1 differs greatly from the data processing system of FIG. 7 in the content provided in the boot firmware environment variable area stored in the nonvolatile memory NM. The boot firmware environment variable area NM2 provided in the data processing system according to the related art shown in FIG. 7 was only the environment data comprised of the "boot-device". Therefore, in the data processing system of the present embodiment shown in FIG. 1, the boot firmware environment variable area NM21 is provided with the environment data comprised of the first variable "boot-device", the second variable "boot-device-index", and the third variable "boot-device-index-available".

Therefore, the data processing system of the present embodiment shown in FIG. 1 shows the general configuration in the case of switching the boot disk device by the boot firmware and the system software and takes as an example the case of switching the duplexed devices, that is, disk devices. The switching processing will be explained below while referring to the flow chart of the processing routine of FIG. 2.

Figure 2:
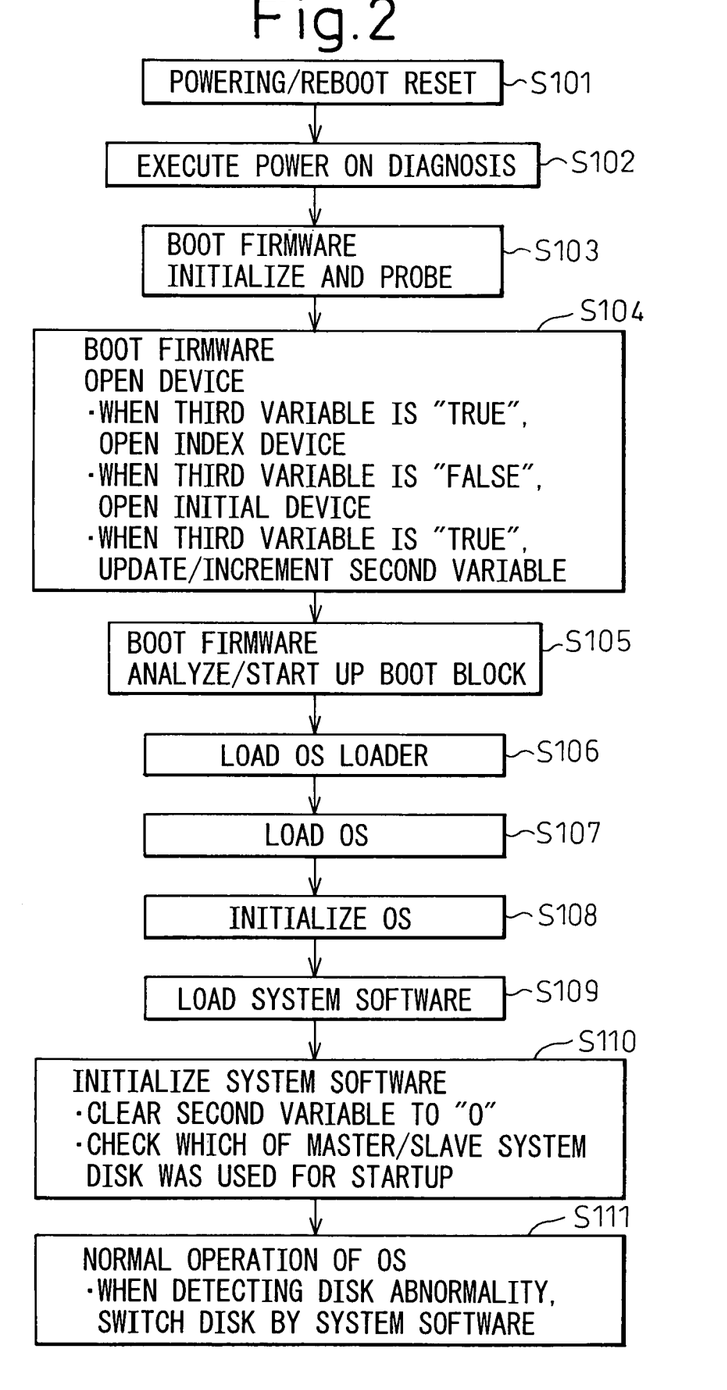
FIG. 2 is a flow chart for explaining a processing routine at the time of system startup of a data processing system of the present embodiment.

First, when the system is powered up or rebooted and reset (step S101), the system starts up the self diagnosis firmware (POST) NM1 for executing its own hardware diagnosis stored in the nonvolatile memory NM, for example, the flash memory. Therefore, to guarantee that the system starts up normally right after the system is powered up or right after it is rebooted and reset, the hardware self diagnosis is executed (step S102).

The self diagnosis firmware NM1 executes diagnosis of the system including the main memory M, so normally operates by the codes in the flash memory as they are. After diagnosis of the main memory M, sometimes the codes are loaded in the main memory M and operate in the main memory. Further, after diagnosis of the cache memory of the CPU, sometimes the working codes are loaded in the cache memory and operate. The self diagnosis firmware NM1 creates hardware configuration data as the result of diagnosis of the hardware and transfers that data to the later mentioned boot firmware M1.

When the diagnosis by the self diagnosis firmware NM1 ends, control is shifted to the boot firmware M1 (step S103). The codes of the boot firmware M1 are normally stored in the nonvolatile memory NM, for example, a flash memory etc., and the working codes are loaded in the main memory M and operate in the main memory M. Further, the codes are sometimes not stored in the flash memory, but are downloaded from the outside to the main memory M by the self diagnosis firmware NM1.

The boot firmware M1 initializes the disk driver, console driver, and other boot drivers so that the booted programs, that is, the boot block program, operating system loader, and operating system, can perform a boot based on the hardware configuration data prepared by the self diagnosis firmware NM1 (step S103). Further, the boot firmware M1 builds a memory environment or other environment so that the boot programs are operated.

Next, the boot firmware M1 checks for the reset factor as part of the initialization. If the reset factor was the power up, the second variable "boot-device-index" stored in the boot firmware environment variable area NM21 of the nonvolatile memory NM is cleared to "0". If the reset factor is a reboot not the power up, the value of the second variable is not changed.

If the processing proceeds up to the booting, the boot firmware M1 selects the boot disk device in accordance with the values of the first variable "boot-device", the second variable "boot-device-index", and the third variable "boot-device-index-available" (step S104).

The boot firmware M1 accesses selected boot disk device, reads the configuration data of the disk, and confirms that the disk is operating normally. If the selected disk cannot operate normally, the boot disk device is changed to the next candidate. At this time, the value of the second variable "boot-device-index" is changed. Further, even when the selected boot disk device cannot operate normally, in preparation for the case where the system software M5 cannot be started up normally and a boot is performed again, the value of the second variable "boot-device-index" is updated so as to forcibly switch to the next candidate.

Note that if there is no disk which can be selected when selecting the disk from the values of the three variables "boot-device", "boot-device-index", and "boot-device-index-available" stored in the boot firmware environment variable area NM21 or if there is no disk device which can be selected when trying to change the disk device to the next candidate, an error message is notified and the processing is stopped.

The boot firmware M1 reads the boot block program written in the start block at the disk device D1 into the main memory M and shifts control to the read boot block program M2 when the disk device D1 is selected for the boot (step S105).

When the boot block program M2 is started up, the boot block program M2 reads the operating system loader stored in the disk device D1 in which it is stored itself into the main memory M1 and shifts control to the operating system loader M3 (step S106).

When the operating system loader M3 is started up, the operating system loader M3 reads the operating system stored in the disk device D1 in which it is stored itself into the main memory M, whereby control is transferred to the operating system M4 (step S107).

Therefore, when the operating system M4 is initialized and the operating system M4 is started up (step S108), the operating system M4 reads the system software stored in the disk device D1 in which it is stored itself into the main memory M and starts up the system software M5 (step S109).

Further, when the system software M5 starts up normally, the system software M5 clears to 0 the second variable "boot-device-index" recorded in the boot firmware environment variable area NM21. Due to this processing, even at the next reboot, the above boot is executed from the same disk device D1 again. Which disk device, that of the master system or that of the slave system, is used for startup is checked. When it is recognized that the disk device of the slave system was used for startup, an error message is notified (step S110). The subsequent processing for switching the disk devices is executed by the system software M5 (step S111).

Therefore, when the system software M5 could not be normally started up, the second variable "boot-device-index" recorded in the boot firmware environment variable area NM21 remains in the state updated by the processing at the above step S104, so at the time of the next reboot, the next candidate disk device is forcibly made the boot device. Further, since an abnormality is detected in the disk device selected by the processing at step S104 and the second variable "boot device index" finishes being updated excessively by that amount, the next candidate disk device is forcibly made the boot device at the time of the next reboot.

Note that at step S104, when detecting an abnormality of the disk device by open processing of the boot disk device, as explained above, processing is performed to cut off the disk device for which the abnormality is detected in the same way as the data processing system of the related art.

Further, when an abnormality occurs in the disk device and a panic state is reached during the processing interval from steps S105 to S109 before reaching the initialization of the system software M5, in the data processing system of the related art, the system software M5 did not start up, so processing was not performed for switching the disk devices. In the data processing system of the present embodiment, however, it is possible to confirm that the system software M5 cannot be started up normally and possible to forcibly switch the disk devices. When an abnormality occurs in the disk device of the master system among the duplexed devices, therefore, it is possible to avoid the problem of the system software performing control of the duplexing not operating and therefore it not being possible to switch to the disk device of the slave system and therefore the system not being able to be started up.

In this way, the explanation was made of the processing routine for switching boot disk devices by boot firmware and system software for the duplexed disk devices in the data processing system shown in FIG. 1. Next, the detailed configuration of the boot firmware M5 in the data processing system of the present embodiment shown in FIG. 1 and the routine of the processing for switching boot disk drives by the boot firmware M5 will be explained below.

Figure 3:
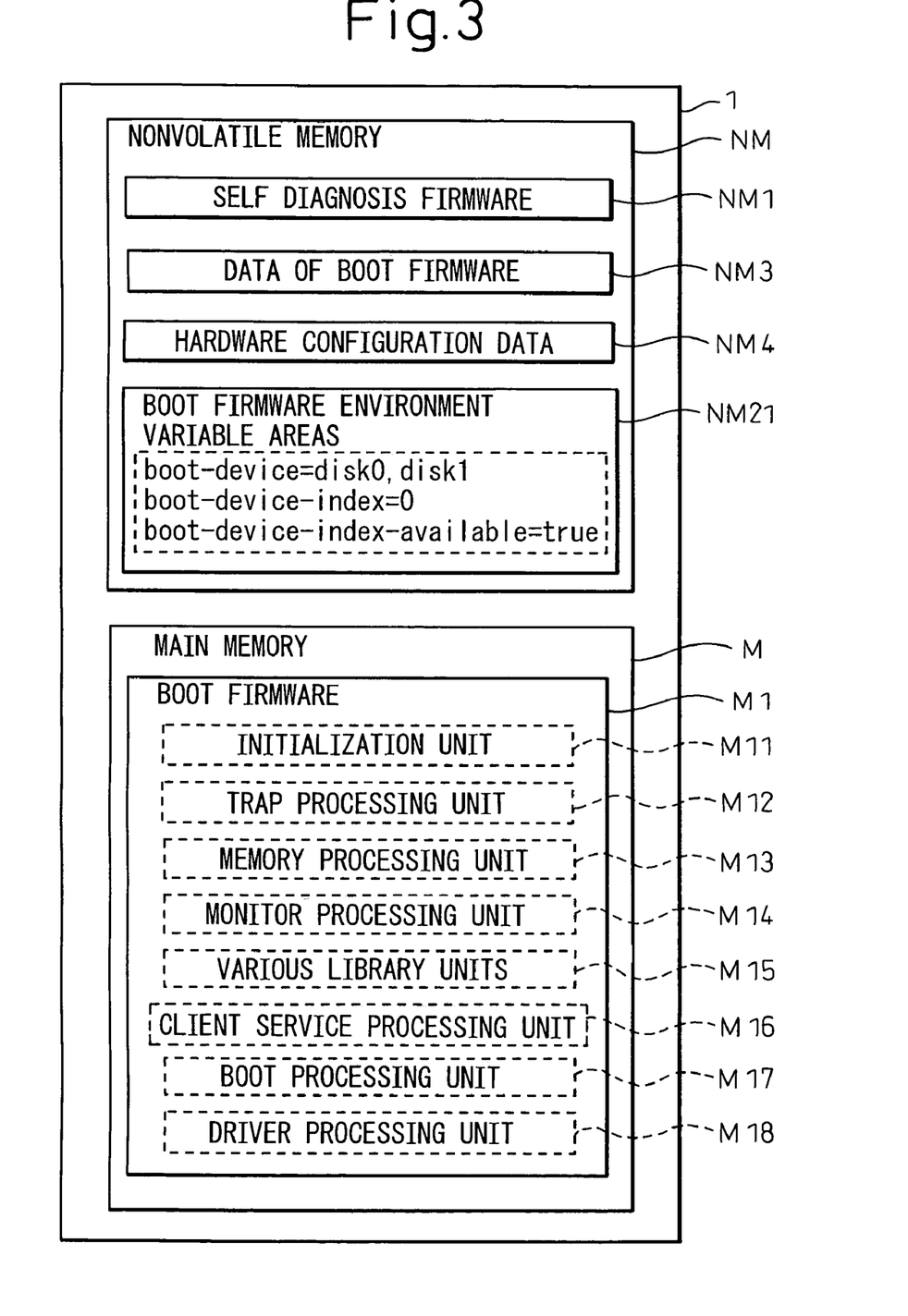
FIG. 3 is a view for explaining the loading of boot firmware in a main memory at the time of system startup of a data processing system according to the present embodiment.

FIG. 3 shows the state of storage of the nonvolatile memory NM provided in the control device 1 of the data processing system of the present embodiment shown in FIG. 1 and a specific example of the configuration of the boot firmware M1 read into the main memory M. In FIG. 3, parts similar to FIG. 1 are assigned the same reference notations.

The nonvolatile memory NM provided in the control device 1 stores a self diagnosis firmware (POST) NM1, compressed data NM3 of the boot firmware, and hardware configuration data NM4. These are prepared in the nonvolatile memory NM of the data processing system of the related art as well. Instead of the boot firmware environment variable area NM2 stored in the nonvolatile memory NM of the related art, the boot firmware environment variable area NM21 of FIG. 3 is provided with environment data comprised of the first variable "boot-device", second variable "boot-device-index", and third variable "boot device index available".

On the other hand, the boot firmware M1 is similar to the configuration of the boot firmware M1 of the related art and is comprised of an initialization unit M11, trap processing unit M12, memory processing unit M13, monitor processing unit M14, various library units M15, client service processing unit M16, boot processing unit M17, and driver processing unit M18. The boot firmware M1 having this module configuration is read from the data NM of the boot firmware to the inside of the main memory M after completion of the self diagnosis of the system whereupon the compressed stored data is expanded and loaded. The boot firmware M1 operates on the main memory M1. These units are as follows.

The initialization unit M11 initializes the modules of the boot firmware M1. Anything that requires initialization in the environment data stored in the boot firmware environment variable area NM21 of the nonvolatile memory NM is initialized here.

The trap processing unit M12 executes processing for traps occurring in the operating environment of the boot firmware M1. Some of the traps are caused by hardware failure while others are caused by part of the normal processing such as the processing of a memory management unit (MMU) miss. Further, in the process of the boot of the operating system, in the boot block program M2 and operating system loader M3 operating loaded in the main memory M, the trap vector operates in the environment of the boot firmware M1, so the processing of traps occurring at the time of their operation is also performed in the trap processing unit M12. For the operating system M4 loaded in the main memory M as well, the trap processing until before change of the initial trap vector is performed by the trap processing unit M12.

The memory processing unit 13 assigns logical addresses from the configuration of the physical memory notified by the hardware configuration data NM4 of the nonvolatile memory NM. Further, it assigns dynamic memory as a result of the processing of the MMU miss. Also, it performs dynamic allocation/release processing of the logical memory.

The monitor processing unit M14 supports the command input/output methods of the man-machine interface of the boot firmware M1, while the various library units M14 are various support modules.

The client service processing unit M16 has the function of an interface for dynamically allocating memory space to the boot block program M2, operating system loader M3, operating system M4, and other client programs loaded in the main memory M and for accessing the disk device or providing other services. The client programs can utilize the functions of the boot firmware M1 through the client service processing unit M16. It is possible to use this function to read the boot block program, operating system loader, and operating system stored in the boot disk drive to enable booting.

The boot processing unit M17 is a module for supporting a boot. It has the function of deciding on the boot disk device in accordance with the values of the environment data stored in the boot firmware environment variable area NM21 of the nonvolatile memory NM, loading the boot block program stored in the start block of the boot disk drive into the main memory M, and transferring control to it. This module performs the processing of step S104 characterizing this embodiment.

The driver processing unit M18 controls the input/output devices which the boot firmware M1 supports. This includes a disk driver, SCSI driver, console driver, etc.

Figure 4:
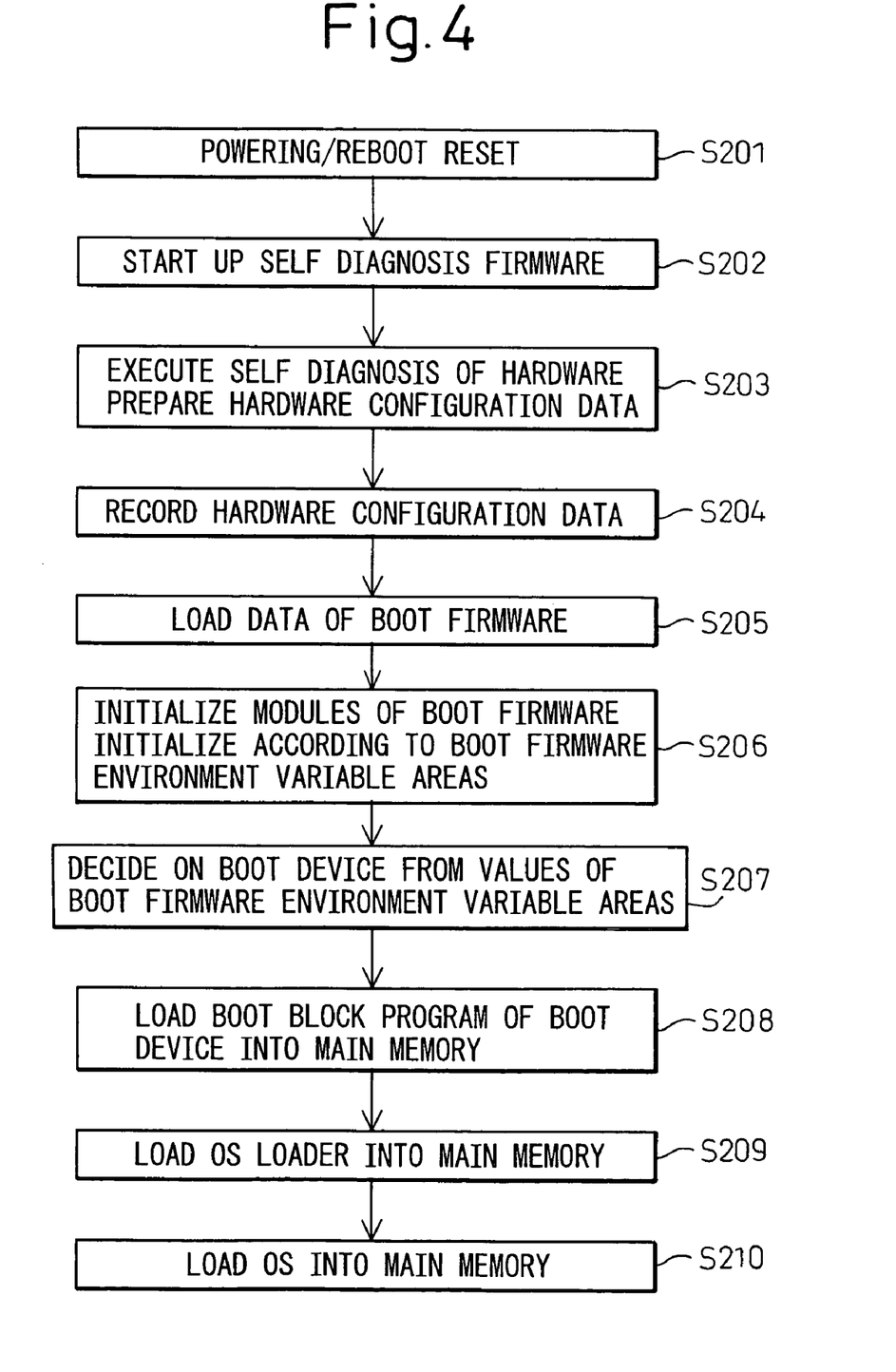
FIG. 4 is a flow chart for explaining a processing routine by boot firmware at the time of system startup of a data processing system according to the present embodiment.

The operation of the boot firmware M1 comprised of the above modules on the main memory M will be explained next referring to the flow of processing of FIG. 4.

First, immediately after powering up or immediately after reboot and reset (step S201), the system starts up the self diagnosis firmware (POST) written in the nonvolatile memory such as the flash memory (step S202).

The self diagnosis firmware NM1 executes hardware diagnosis for guaranteeing that the system has started up normally. As a result of the diagnosis, it prepares hardware configuration data (step S203) and records it in the hardware configuration data NM4 of the nonvolatile memory NM (step S204). This configuration data is used for subsequent recognition of the hardware configuration by the boot firmware M1.

After hardware diagnosis by the self diagnosis firmware NM1, the boot firmware M1 can operate on the main memory M since it is a program started up after diagnosis of the main memory M. The binary data of the boot firmware M1 is normally stored in a compressed form in the flash memory in the system. After POST diagnosis, it is expanded and loaded in the main memory M by POST (step S205). Alternatively, the data of the boot firmware M1 is not stored in the flash memory in the system, but data compressed by POST from the outside is expanded in the main memory M and downloaded.

Further, in the same way as the processing of step S104 shown in FIG. 2, the initialization of the modules M11 to M18 of the boot firmware M1 is executed and the initialization unit M11 executes initialization in accordance with the boot firmware environment variable area NM21 in accordance with the hardware configuration data NM4 (step S206).

The boot processing unit M17 decides on the boot disk device in accordance with the environment data of the boot firmware environment variable area NM21 (step S207). Therefore, the boot processing unit M17 accesses the decided boot disk device, reads the boot block program stored in the start block of the disk device, and loads it in the main memory M (step S208). The boot block program M2 has the function of loading the operating system loader in the main memory and transferring control to it.

Next, the boot block program M2 read into the main memory M utilizes the client service processing unit M16 to read the operating system loader stored after the boot block program at the start block of the boot disk device and load it in the main memory M (step S209). The operating system loader M3 has the function of interpreting the file system of the operating system and has the function of loading the operating system program stored in the boot disk device in the main memory and transferring control to it.

The operating system loader M3 read in the main memory utilizes the function of the client service processing unit M16 to read the operating system after the operating system loader stored in the boot disk device and load it into the main memory M (step S210). This processing is similar to step S108 of the processing flow shown in FIG. 2. The processing from step S210 on is the same as the processing from step S109 on.

Above, the explanation was given of the detailed configuration of the boot firmware M5 in the data processing system of the present embodiment and the routine of the switching processing of the boot disk device by the boot firmware M5. Next, the switching processing of the disk device after the system software stored in the boot disk device is read out and loaded in the main memory M in the control device 1 in the data processing system of the present embodiment will be explained with reference to the flow chart of FIG. 5.

Figure 5:
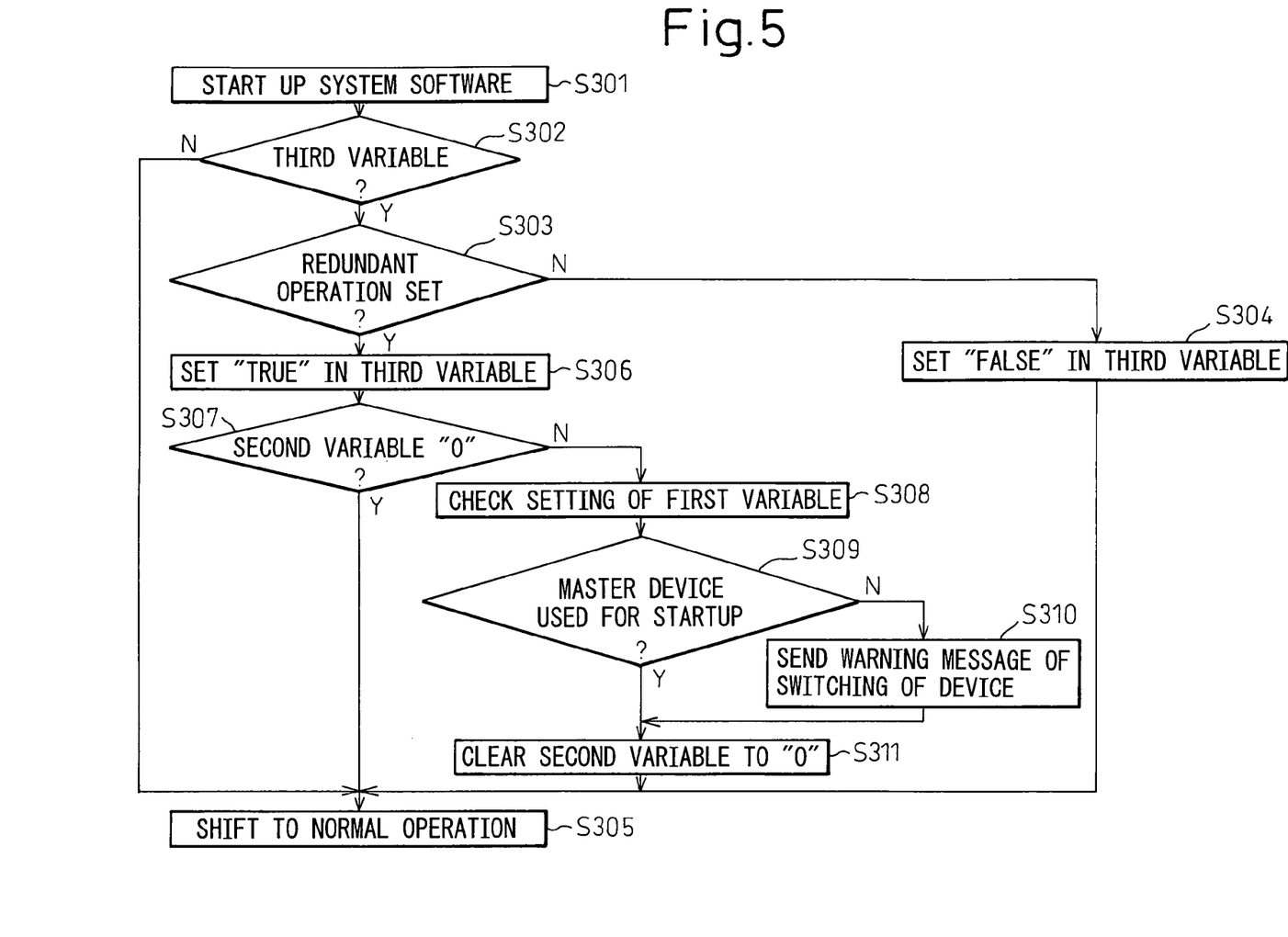
FIG. 5 is a flow chart for explaining a processing routine by system software at the time of system startup of a data processing system according to the present embodiment.

First, the system software M5 read into the main memory M is initialized and started up as explained at step S110 (step S301).

Next, the system software M5 investigates the boot firmware environment variable area NM21 of the nonvolatile memory NM and checks if there is a third variable "boot-device-index-available" (step S302).

Here, if a boot by the boot firmware M1 by the configuration of a data processing system of the related art before the present embodiment is executed, as shown in FIG. 7, the boot firmware environment variable area NM2 will not have the third variable "boot-device-index-available" ("N" at step S302), so the operation will be in the range of the system configuration of the related art shown in FIG. 7 and therefore normal operation of the operating system will immediately be shifted to (step S305).

If executing the present embodiment, in the processing of step S302, there will be the third variable "boot device index available" (Y) and whether the redundant operation function of the boot disk devices has currently been set is checked (step S303). The system software M5 is software for enhancing the reliability by redundant operation of the boot disk devices, but sometimes this function is invalidated. Therefore, the current setting is checked here.

When the check of the setting of the redundant operation function at step S303 shows that the system software M5 has been set for redundant operation of the boot disk devices (Y), the value "true" is set in the third variable "boot-device-index-available" of the boot firmware environment variable area NM21 (step S306). The third variable "boot-device-index-available" is set to the value "false" in the initial default state. In this case, the forcible disk switching function at the boot firmware M1 will not work.

However, once the value is set to "true", the third variable is recorded in the boot firmware environment variable area NM21 of the nonvolatile memory NM, so this value will not change unless deliberately changed by someone. If "true" ends up being set for the third variable when the system software M5 is not installed, even if forcibly switching the boot disk device at the time of a boot by the boot firmware M1, the original state will no longer be returned to. Therefore, the boot will fail. To avoid this, the value of the third variable is set to "true" by the system software M5.

When the system software M5 is installed and running, if the value of the third variable is once set to "true", the value of the third variable will be held in the boot firmware environment variable area NM21 of the nonvolatile memory NM, so the redundant operation function will become valid. Note that in this processing flow, the startup of the system software M5 checks the state of redundant operation of the boot disk devices and changes the third variable. Here, it is also possible not to make any change, but to set the value at the time of installing the system software M5 or to check the state of redundant operation and set the value from the menu of the system software M5 after entering the normal operating state. It is important that the system software M5 set the value of the third variable to "true".

When the check processing at step S303 shows that the system software M5 was not set for redundant operation of the boot disk devices (N), the value "false" is set in the third variable "boot-device-index-available" of the boot firmware environment variable area NM21 (step S304).

Next, whether the second variable "boot-device-index" of the boot firmware environment variable area NM21 is "0" or not is investigated (step S307). The value of the second variable is "0" as shown by the flow in FIG. 2 only when the value of the third variable "boot-device-index-available" was "false" at the time of operation of the boot firmware M1. If the value of the third variable "boot-disk-unit-index-available" was "true" at the time of operation of the boot firmware M1, the value of the second variable "boot-device-index" is updated (incremented) by the boot. Therefore, when the value of the second variable is "0" ("Y" at step S307), the switching function of the present embodiment is not valid, so normal operation is immediately switched to (step S305).

On the other hand, when the value of the second variable "boot-device-index" is not "0" ("N" at step S307), it shows that the value of the third variable "boot-device-index-available" was "true" at the time of operation of the boot firmware M1. In this case, the setting of the first variable "boot-device" is checked (step S308) and whether the disk device actually booted was the master system or the slave system is checked (step S309).

In general, when the value of the second variable "boot-device-index" is "1", it shows that the master system was used for startup, while when it is "2" or more, it shows that a slave system was used for startup. Depending on the settings of the system, sometimes the same disk device is set a plurality of times by different names in the setting of the first variable "boot-device". In this case, a value of "2" of the second variable "boot-device-index" may also sometimes indicate the device of the master system. Here, this situation is also considered and confirmed.

When the result of the confirmation in the processing of step S309 is that the boot disk device could be confirmed not to be the master system (N), some sort of abnormality occurred in the startup of the disk device of the master system, so a warning message notifying this is displayed (step S310).

Whether the boot device is the master system or the slave system, the fact is that the system software M5 has started up normally. In the next reboot, the value of the second variable "boot-device-index" is cleared to 0 so that the boot can be executed normally again at the next reboot (step S311) and then normal operation is shifted to (step S305). Note that here the value is cleared to 0, but it is also possible to decrement the value to show the device for which the boot finally succeeded.

At step S305, normal operation is shifted to. If an abnormality of the disk device is detected during processing of normal operation, the boot disk device is cut off by the system software M5. In the next boot, the boot disk device is switched by the system software M5 directly rewriting the value of the second variable "boot-device-index" of the environment data. This processing is similar to the case of the related art. Note that at this time, when at step S311, the value of the second variable "boot-device-index" is decremented without being cleared to 0, the value of the second variable "boot-device-index" is also rewritten or cleared to 0 in accordance with the change of the first variable "boot-device".

As explained above, according to the data processing system of the present embodiment, it is possible to realize a computer system duplexing the disk device storing the operating system, that is, the bootable device, so as to give redundancy against hardware errors occurring in accessing a disk device at the time of operation and thereby improve the reliability. By linking the boot firmware and the system software for processing for duplexing the disk devices, when the system software stored in the boot device of the master system cannot be started up, in the next boot by the boot firmware, it is possible to forcibly switch the boot device to the boot device of the slave system and thereby start up the system software from the boot device of the slave system.

As explained above, in the data processing system of the present invention, in a system multiplexing boot devices, that is, disk devices, to improve the redundancy, it is possible to switch the boot device to the disk device of the slave system even when an abnormality occurs in the disk device of the master system selected by the boot firmware before the system software for controlling multiplexing starts up.

Further, the system software for controlling multiplexing of the boot device is software operated under the operating system after the operating system stored in the boot device is started up. The operating system itself is started up by the boot loader. In the data processing system of the present invention, the method for setting boot firmware environment data stored in the nonvolatile memory of the system is modified so that the boot device can be switched to the disk device of the slave system even when an abnormality occurs in the disk device of the master system before the system software for controlling multiplexing starts up. Therefore, even when the operating system and boot loader are not allowed to be changed, switching of the boot device can be realized without making any change at all to the operating system or boot loader.

While the invention has been described with reference to specific embodiments chosen for purpose of illustration, it should be apparent that numerous modifications could be made thereto by those skilled in the art without departing from the basic concept and scope of the invention.

What is claimed is:

1. An apparatus where an operating system, read out from a selected device of a multiplexed plurality of devices containing respective operating systems, is started up for starting up a data processing system, comprising:

a storing unit which stores environment data setting a boot from said plurality of devices, where said environment data includes: first variable data including device setting data designating boot candidates for said plurality of devices, second variable data including index data setting a booting order of said boot candidates set by said device setting data, and third variable data in which whether said multiplexing of the plurality of devices is valid or not valid is set;

a boot control unit which decides on a boot device according to data set by said first variable data, said second variable data and said third variable data included in said environment data, and starts up said respective operating system stored in said boot device; and a control unit which controls setting said environment data of said plurality of devices, setting valid for multiplexing in said third variable data when a first boot candidate included in said device setting data is accessed according to said booting order defined by said second variable data, changing said booting order of said boot candidates in said index data included in said second variable data when an abnormality is detected in said boot device, and clearing said index data of said second variable data to an initial value when booting is successful, said boot control unit switching said accessed boot device to another boot device according to a changed booting order of said index data and controlling starting up of said respective operating system stored in said another boot device.

2. The apparatus as set forth in claim 1, wherein said boot control unit clears said index data to said initial value when powering up the data processing system and selects as said boot device an initially set device in said device setting data.

3. The apparatus as set forth in claim 1, wherein said boot control unit selects said boot device based on said index data when valid for multiplexing is set in said third variable data and selects as said boot device an initially set device in said device setting data when not valid for multiplexing is set in said third variable data.

4. The apparatus as set forth in claim 3, wherein said boot control unit updates an index in said index data when valid for multiplexing is set in said third variable data.

5. The apparatus as set forth in claim 4, wherein said boot control unit selects said boot device based on said environment data and reads in and starts up said operating system stored in said boot device.

6. The apparatus as set forth in claim 1 wherein said control unit refers to said first variable data and confirms that said boot device is in a slave system has been used for startup when valid for multiplexing is set in said third variable data and said index data is not set to said initial value.

7. The apparatus as set forth in claim 6, wherein said control unit issues a warning message showing that an abnormality has occurred in a master boot device of a master system when recognizing that said boot device in said slave system has been used for startup.

8. The apparatus as set forth in claim 6, wherein said control unit clears said second variable data to said initial value when valid is set in said third variable data and said second variable data is not set to 0.

9. The apparatus as set forth in claim 1, wherein said control unit sets not valid for multiplexing in said third variable data when the third variable data is present in said storing unit and said plurality of devices are not set for redundant operation.

10. The apparatus as set forth in claim 1, wherein said control unit cuts off said booting when detecting said abnormality in said boot device without regard as to if there is said third variable data in said storing unit and rewrites said device setting data designating said boot candidates in said first variable data.

11. The apparatus as set forth in claim 1, wherein said storing unit is a nonvolatile memory and wherein said boot control unit and said control unit rewrite said second variable data and said third variable data stored in said storing unit.

12. The apparatus as set forth in claim 1, wherein said boot control unit executes said booting by boot firmware stored in said storing unit.

13. The apparatus as set forth in claim 1, wherein said control unit executes controlling multiplexing of said plurality of devices based on system software read out from said boot device and stored in said storing unit, said system software checks multiplexing of the plurality of devices in the system, and processes switching said boot device said another device when said abnormality has occurred in said boot device.

14. The apparatus as set forth in claim 2, wherein said boot control unit selects said boot device based on said environment data and reads in and starts up said operating system stored in said boot device.

15. The apparatus as set forth in claim 3, wherein said boot control unit selects said boot device based on said environment data and reads in and starts up said operating system stored in said boot device.

16. A method for starting up data processing system in which an operating system read out from a selected device of a multiplexed plurality of devices containing respective operating systems, is started up for starting up the system, comprising:

storing environment data setting a boot from said plurality of devices, where said environment data includes: first variable data including device setting data designating boot candidates for said plurality of devices, second variable data including index data setting a booting order of said boot candidates set by said device selling data, and third variable data in which whether said multiplexing of the plurality of devices is valid or not valid is set;

deciding on a boot device according to data set by said environment data and executing a boot control which starts up said respective operating system stored in said boot device; and setting valid for multiplexing in said third variable data when a first boot candidate included in said device setting data is accessed according to said booting order defined by said second variable data, changing said booting order of said boot candidates in said index data included in said second variable data when an abnormality is detected in said accessed boot device, clearing said index data of said second variable data to an initial value when booting is successful, and switching said accessed boot device to another boot device according to a changed booting order of said index data and controlling starting up of said respective operating system stored in said another boot device.

17. A computer-readable recording medium storing a program which starts up an operating system read out from a selected device of a multiplexed plurality of devices containing respective operating systems, and starts up a data processing system, the program which when executed by a computer causes the computer to perform a process, comprising:

storing environment data setting a boot from said plurality of devices, where said environment data includes: first variable data including device setting data designating boot candidates for said plurality of devices, second variable data including index data setting a booting order of said boot candidates set by said device setting data, and third variable data in which whether said multiplexing of the plurality of devices is valid or not valid is set;

deciding on a boot device according to data set by said environment data and executing a boot control which starts up said respective operating system stored in said boot device; and setting valid for multiplexing in said third variable data when a first boot candidate included in said device setting data is accessed according to said booting order defined by said second variable data, changing said booting order of said boot candidates in said index data included in said second variable data when an abnormality is detected in said accessed boot device, clearing said index data of said second variable data to an initial value when booting is successful, and switching said accessed boot device to another boot device according to a changed booting order of said index data and controlling starting up of said respective operating system stored in said another boot device.

* * * * *

UNITED STATES PATENT AND TRADEMARK OFFICE
CERTIFICATE OF CORRECTION

| | |
|---|---|
| PATENT NO. | : 7,434,042 B2 |
| APPLICATION NO. | : 10/786054 |
| DATED | : October 7, 2008 |
| INVENTOR(S) | : Yukio Oguma |

Page 1 of 1

It is certified that error appears in the above-identified patent and that said Letters Patent is hereby corrected as shown below:

Column 15, Line 57, after "claim 1" insert --,--.

Column 16, Line 49, change "selling" to --setting--.

Signed and Sealed this

Tenth Day of February, 2009

JOHN DOLL
*Acting Director of the United States Patent and Trademark Office*